United States Patent
Bailey et al.

(10) Patent No.: US 8,377,183 B2
(45) Date of Patent: *Feb. 19, 2013

(54) HIGH CLEANING EFFICIENCY ROOM AIR CLEANER WITH SLIM PROFILE

(75) Inventors: Matthew T. R. Bailey, Ottawa (CA); Ross L. Cowie, Ottawa (CA); Rudy A. Vandenbell, Ottawa (CA); David Harris, Hollis, NH (US)

(73) Assignee: Lasko Holdings, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/300,888

(22) Filed: Nov. 21, 2011

(65) Prior Publication Data

US 2012/0060694 A1 Mar. 15, 2012

Related U.S. Application Data

(63) Continuation of application No. 12/249,080, filed on Oct. 10, 2008, now Pat. No. 8,083,840.

(51) Int. Cl.
*B01D 46/00* (2006.01)

(52) U.S. Cl. ........... 96/222; 55/471; 55/472; 55/482; 55/502; 96/224

(58) Field of Classification Search ........... 55/358, 55/467, 470, 471, 472; 96/222, 224
See application file for complete search history.

(56) References Cited

U.S. PATENT DOCUMENTS

| | | | | |
|---|---|---|---|---|
| 5,803,940 | A * | 9/1998 | Rick et al. | 55/490 |
| 5,840,092 | A * | 11/1998 | Rick et al. | 55/472 |
| 7,621,984 | B2 * | 11/2009 | Cowie et al. | 96/41 |
| 2008/0101998 | A1 * | 5/2008 | Armstrong | 422/121 |
| 2008/0286163 | A1 * | 11/2008 | Garfield et al. | 422/120 |

* cited by examiner

*Primary Examiner* — Duane Smith
*Assistant Examiner* — Sonji Turner
(74) *Attorney, Agent, or Firm* — Albert Peter Durigon

(57) ABSTRACT

A high cleaning efficiency room air cleaner with a slim profile providing a clean air delivery rate sufficient to clean any ordinary size room includes a flat-panel housing having an internal chamber sized to receive conventional large area flat-panel furnace filters of standard size and a fan array preferably of high efficiency, low power axial computer fans mounted to the flat-panel housing. The room air cleaner may include a scent cartridge and a UV lamp assembly.

19 Claims, 10 Drawing Sheets

HIGH CLEANING EFFICIENCY ROOM AIR CLEANER WITH SLIM PROFILE

CROSS-REFERENCE TO RELATED APPLICATIONS

The present application is a continuation application of allowed U.S. non-provisional utility patent application Ser. No. 12/249,080, filed Oct. 10, 2008, now U.S. Pat. No. 8,083,840, of the same inventive entity as herein, incorporated herein by reference.

FIELD OF THE INVENTION

This invention is drawn to the field of gas purification, and more particularly, to a novel, high cleaning efficiency room air cleaner with a slim profile.

BACKGROUND OF THE INVENTION

Room air is laden with dirt, dust, allergens, odors, microorganisms and other airborne pollutants. Although room air cleaners have been devised to treat room air so as to remove such airborne pollutants, the heretofore known room air cleaners have been deficient among other things in that they have been inefficient, providing comparatively low cleaning efficiency (clean air delivery rate per watt of power utilized); have produced undesirable amounts of ozone; have needed to be remotely located to walls in otherwise unoccupied open room floor space thereby adding to room clutter; have utilized custom, non-standard-size filters that are costly and inconvenient to obtain; and/or their utility has been limited to removal of a particular type of air pollutant but generally have been unable to selectably remove a variety of different pollutant types. There is thus a need to provide a high cleaning efficiency room air cleaner with a slim profile not subject to the deficiencies of the heretofore known room air cleaners.

SUMMARY OF THE INVENTION

Accordingly, it is one object of the present invention to disclose a high cleaning efficiency room air cleaner providing a high clean air delivery rate per watt of power used.

It is another object of the present invention to disclose a room air cleaner having a slim profile enabling its placement nearby a wall thereby freeing up open room floor space.

It is a further object of the present invention to disclose a room air cleaner selectively capable of removing a variety of different pollutant types.

It is another object of the present invention to disclose a room air cleaner usable with conventional home furnace filters of standard size that are inexpensive and convenient to obtain.

Another object of the present invention is to disclose a room air cleaner that is comparatively inexpensive to manufacture and purchase.

Another object of the present invention is to disclose a room air cleaner providing a clean air delivery rate sufficient to clean a room of ordinary size.

The high cleaning efficiency room air cleaners with a slim profile in accord with these and other objects of the present invention include a flat-panel housing taller and wider than it is thick enclosing a flat-panel filter receiving chamber whose open interior is sized to accept conventional home furnace pleated flat-panel filters of standard size. The flat-panel filter receiving chamber is preferably sized to accept in tandem two (2) home furnace flat-panel pleated filters of standard size. Up to two (2) tandem flat-panel filters of standard size, or a single, custom-size flat-panel filter equal in thickness to the axial thickness of two (2) tandem conventional home furnace flat-panel pleated filters of standard size, may be selectively received in the flat-panel receiving chamber of the flat-panel housing.

The tandem filters of standard size may be conventional off-the-shelf furnace filters having pleated particulate removal media and/or specialty flat-panel filters of the same standard size including ozone removing media, odor removing media, bacteria reducing media and/or some other specialty filter media well known to those skilled in the art. The single, custom-size flat-panel filter equal in thickness to the axial thickness of two (2) tandem conventional home furnace flat-panel filters of standard size preferably is a flat-panel pleated particulate removal filter that may include other specialty filter media.

A planar array of axial fans each taller and wider than it is thick is mounted to the flat-panel housing. The axial fans of the planar fan array cooperate to axially move a plane of air through the open interior of the flat-panel filter receiving chamber that is substantially coextensive in area to the surface area of any conventional home furnace flat-panel pleated filter of standard size.

The fan array preferably is a blower fan array, although an exhauster fan array could be employed, and the axial fans of the blower fan array preferably are high efficiency, low power, brushless DC computer "muffin" fans, although other axial fans may be employed.

In one presently preferred embodiment of a high cleaning efficiency room air cleaner with a slim profile in accord with the present invention providing a clean air delivery rate sufficient to clean an ordinary size room, the fan array is a (3)*(2) blower fan array of computer "muffin" fans and the flat-panel filter is a single, custom-size flat-panel pleated filter equal in thickness to the axial thickness of two (2) tandem conventional home furnace flat-panel pleated filters of standard size.

Means including a peripheral gasket and resilient shoulders are provided for sealing the interface between the confronting surfaces of the fan array and flat-panel filter in the flat-panel filter receiving chamber of the flat-panel housing.

Front and rear grills are mounted to the slim profile flat-panel housing. A scent cartridge is removably mounted to the rear grill upstream of the blower fan array. A UV lamp assembly may be removably mounted inside the flat-panel filter receiving chamber of the flat panel housing.

BRIEF DESCRIPTION OF THE DRAWINGS

These and other objects, advantageous features and inventive aspects of the present invention will become apparent as the invention becomes better understood by reference to the following, solely exemplary, detailed description of the presently preferred embodiments, and to the drawings, wherein.

DETAILED DESCRIPTION OF THE PRESENTLY PREFERRED EMBODIMENTS

Figure 1:
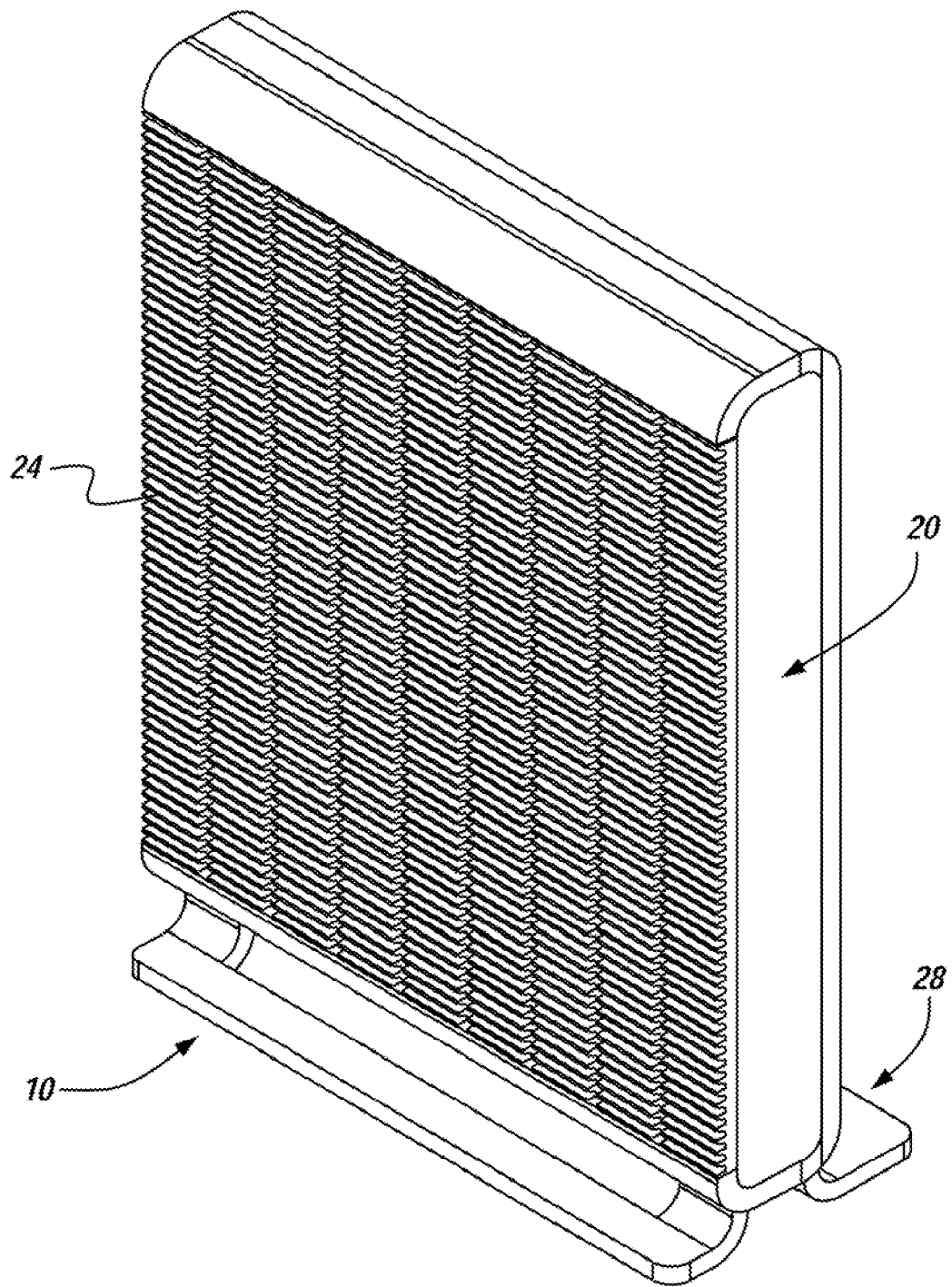
FIG. 1 is an isometric view of a high cleaning efficiency room air cleaner with a slim profile in accord with the present invention.
Figure 2:
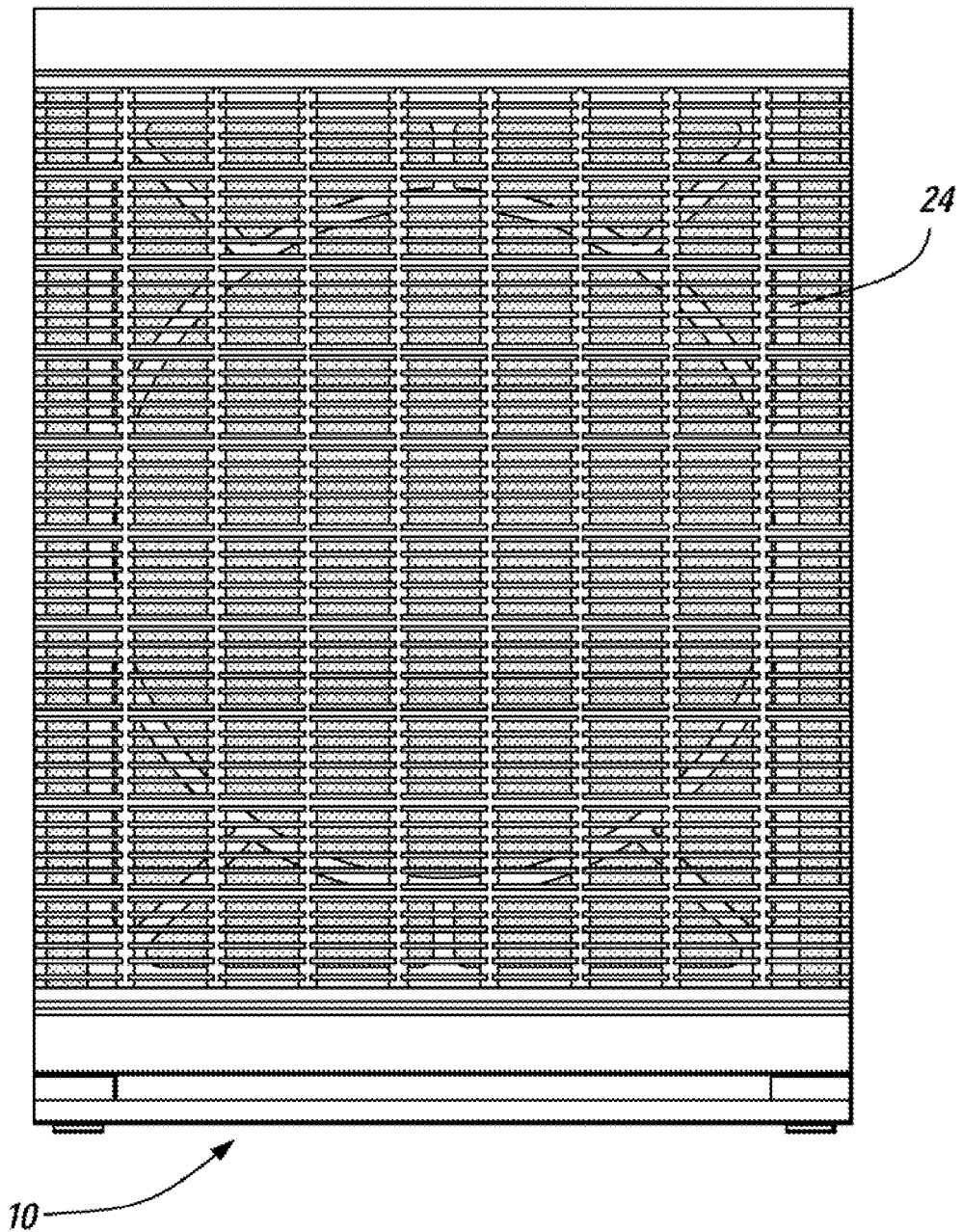
FIG. 2 is a plan view of the front of the high cleaning efficiency room air cleaner with slim profile in accord with the present invention.
Figure 3:
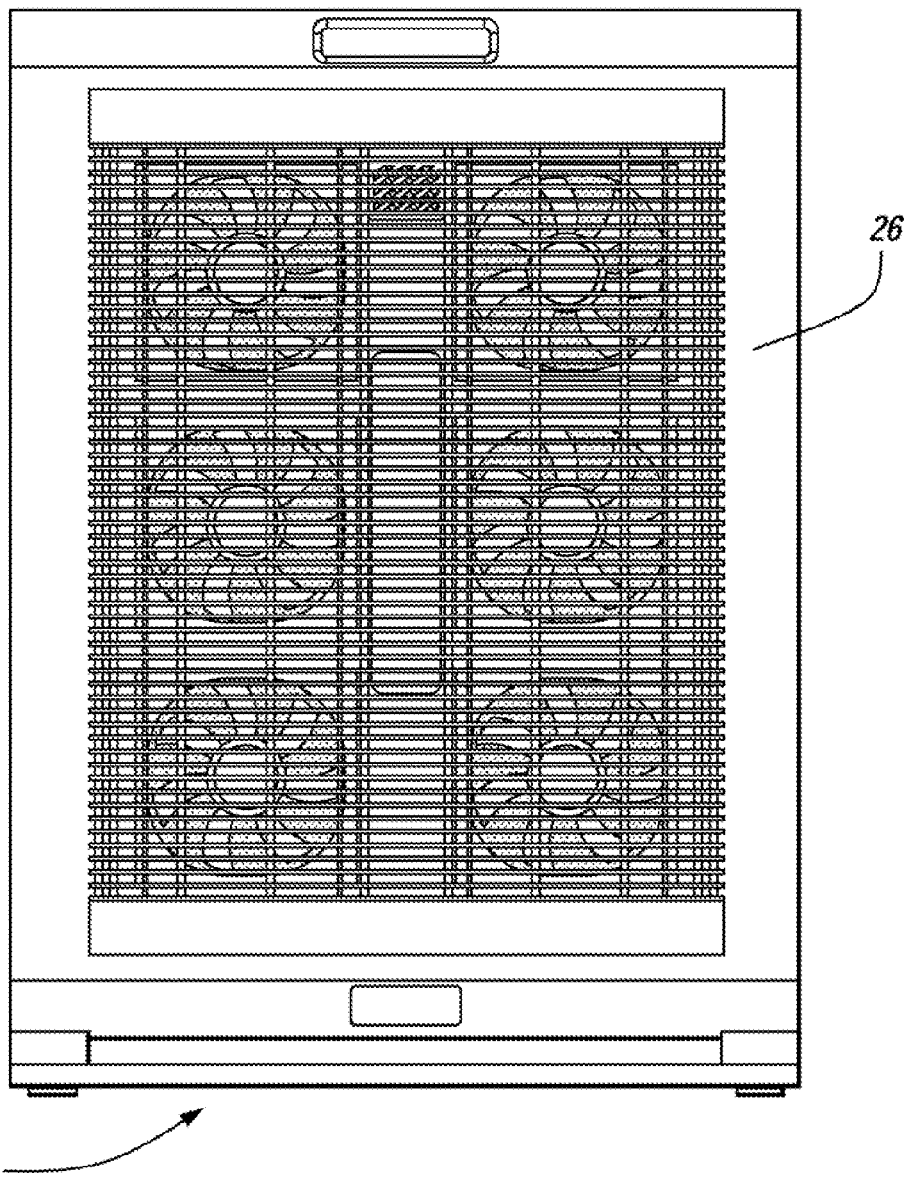
FIG. 3 is a back plan view of the high cleaning efficiency room air cleaner with slim profile in accord with the present invention.
Figure 4:
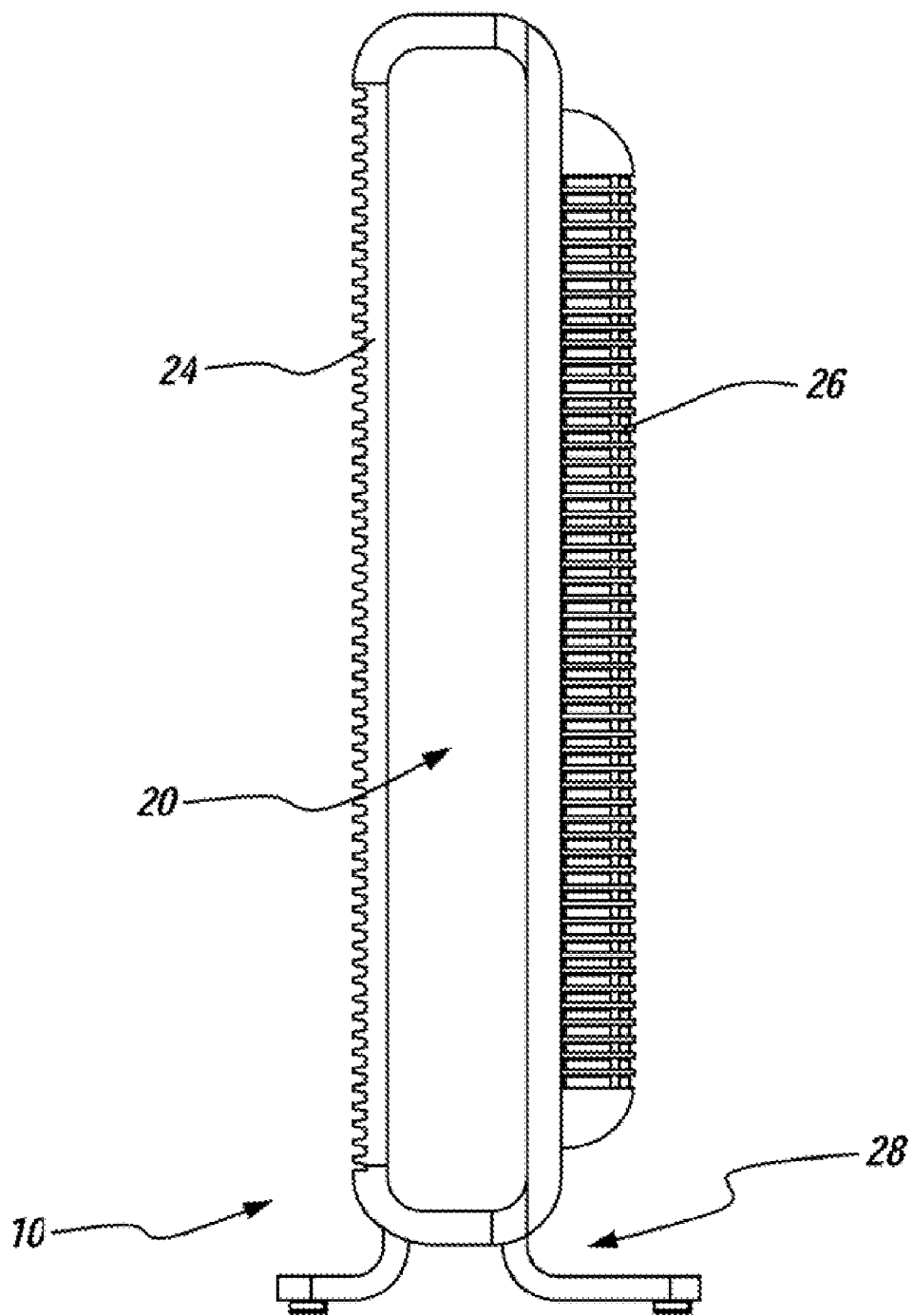
FIG. 4 is a side plan view of the high cleaning efficiency room air cleaner with a slim profile in accord with the present invention.

Referring now to FIGS. 1-5, generally designated at 10 is a high cleaning efficiency room air cleaner with a slim profile in accord with the present invention. The room air cleaner 10 in one presently preferred embodiment is twenty-two (22) inches high by eighteen (18) inches wide by five (5) inches thick, which enables it to hug a wall; accepts up to two (2) flat-panel furnace filters of standard size, namely twenty (20) inches high by sixteen (16) inches wide by one (1) inch thick; and provides a clean air delivery rate effective to clean a standard sized room.

Figure 5:
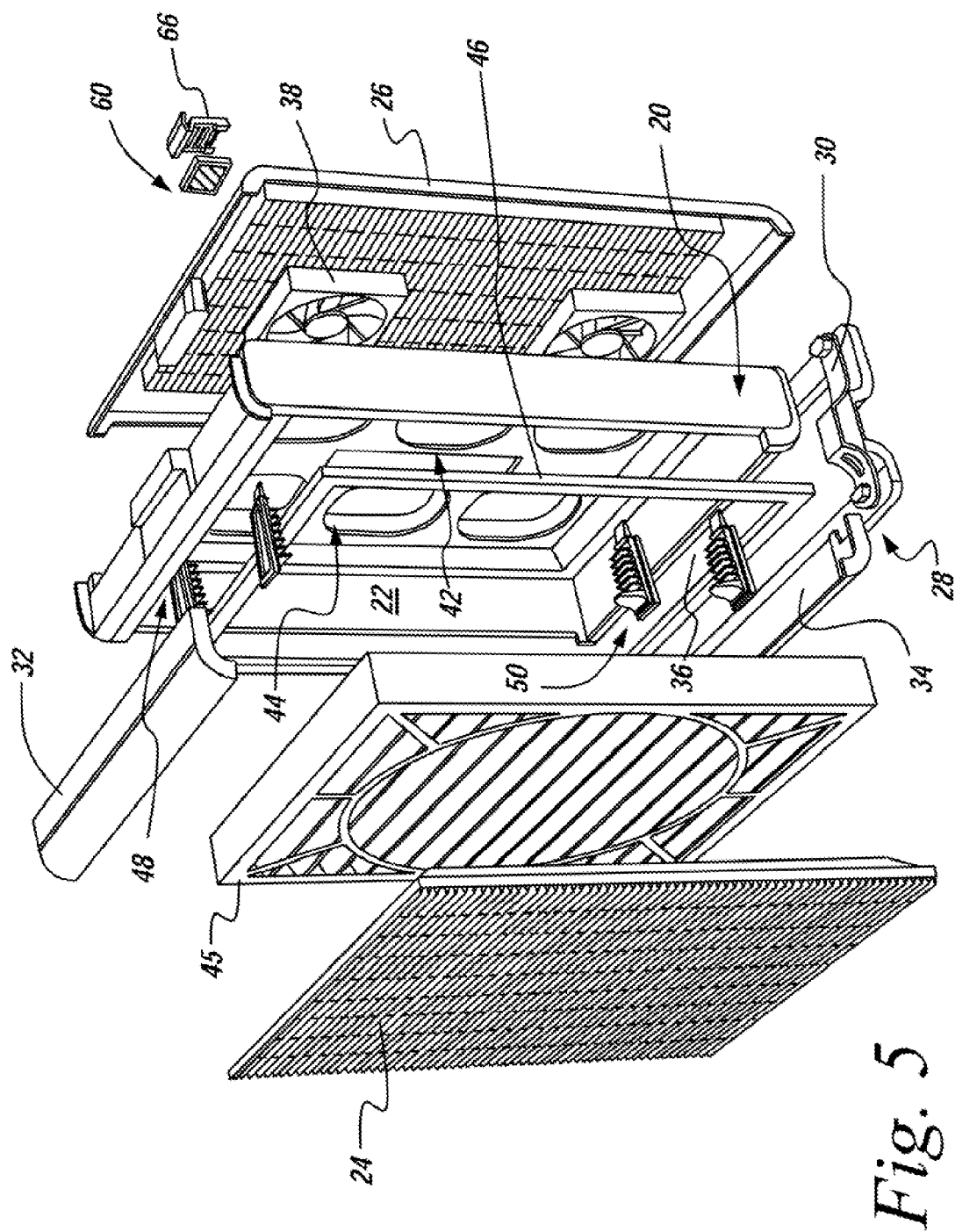
FIG. 5 is an exploded perspective view of the high cleaning efficiency room air cleaner with slim profile in accord with the present invention.
Figure 8:
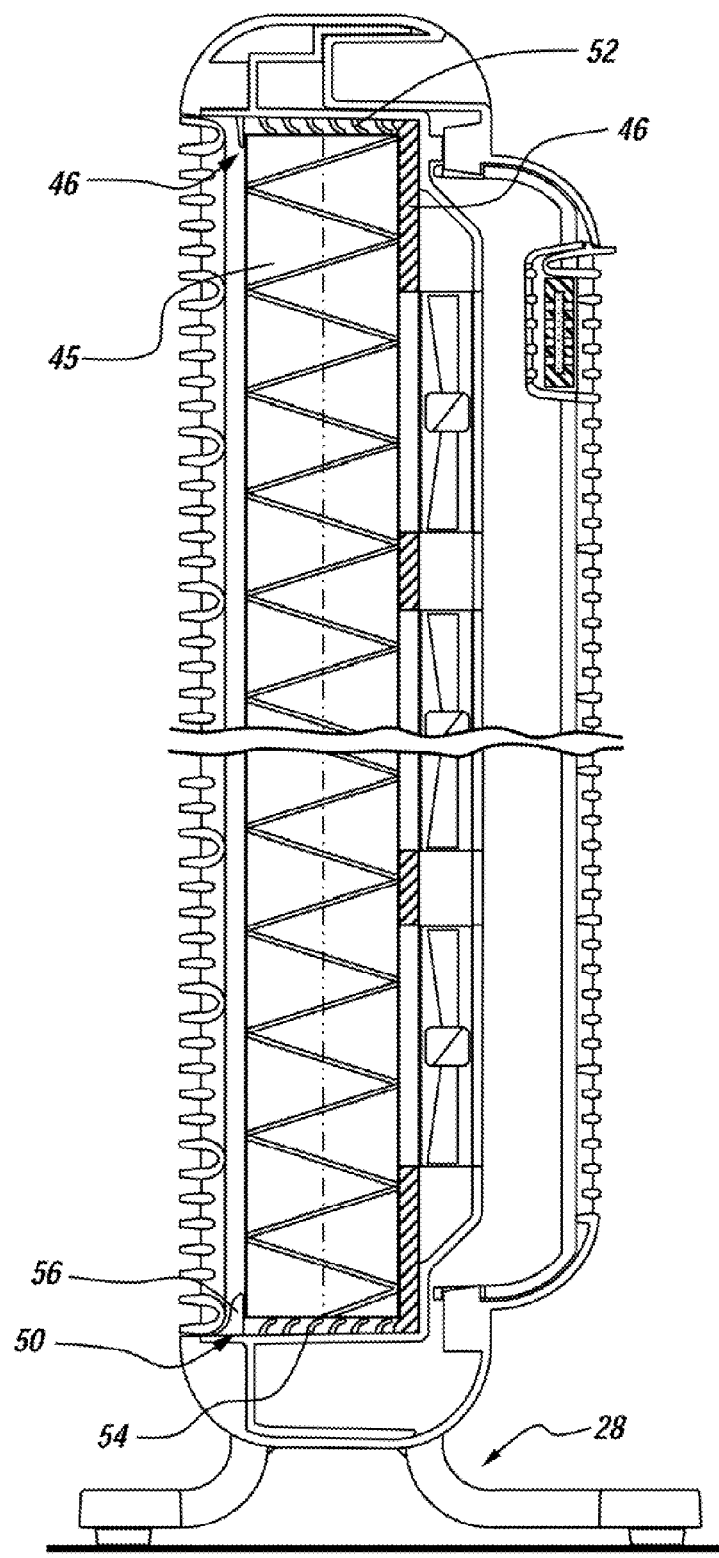
FIG. 8 is a side sectional view of the high cleaning efficiency room air cleaner with a slim profile in accord with the present invention.

The room air cleaner 10 includes a housing member generally designated 20 enclosing a flat-panel receiving chamber generally designated 22 whose open interior is sized to accept conventional home furnace flat-panel pleated filters of standard size. In one presently preferred embodiment, the open interior of the flat-panel receiving chamber is sized to accept up to two (2) home furnace flat-panel pleated filters of standard size although it could be sized to accept one (1) or more than two (2). A removable front grill 24 and a rear grill 26 are mounted to the housing member 20 respectively at its front and rear faces. A stand generally designated 28 having metallic strengthening feet 30 is mounted to the bottom of the housing number 20. As best seen in FIGS. 5 and 8, the closest approach the room air cleaner 10 may make to a side or other wall is defined by the lateral extension of its stand 28.

Top and bottom covers 32, 34 are respectively mounted to the top and bottom of the housing member 20.

A controller PC board 36 mounted to the housing member 20 is operatively coupled to a control panel and user interface, not shown, carried at the top of the housing member 20, to input control information and to display system status information.

A plurality of slim profile axial fans 38 operatively coupled to the PC board 36 and control panel are individually mounted in respective ones of a like plurality of fan receiving openings generally designated 44 formed in the housing member 20 to provide a (3)*(2) blower array at the rear face of the housing member 20. The axial fans 38 of the (3)*(2) blower fan array cooperate to axially move a plane of air through the open interior of the flat-panel receiving chamber 22 of the housing member 20 whose surface area is substantially coextensive in area to the surface area of any standard size conventional home furnace flat-panel pleated filter.

The slim profile axial fans preferably are high efficiency, low power brushless DC computer "muffin" fans of 4.72"×4.72"×0.98" size. Of course, another type of slim profile axial fan, or a different number thereof, and/or an exhauster fan array may be employed.

A UV lamp assembly mounting chamber generally designated 42 for a UV lamp assembly, not shown, is recessed inside the housing member 20 to prevent direct viewing of the UV lamp from the outside of the room air cleaner 10. The UV lamp assembly is operatively connected to the PC board 36 and control panel to controllably provide ultraviolet light at a wavelength effective to kill biological organisms that may be entrained in the airstream moved by the blower fan array through the grills 24, 26 of the room air cleaner 10.

In one presently preferred embodiment, a custom-size low-pressure flat-panel pleated particulate filter 45 twenty (20) inches high by sixteen (16) inches wide by two (2) inches thick is removably mounted in the interior flat-panel receiving chamber 2 of the housing member 20. The low-pressure flat-panel pleated filter 45 cooperates with the high efficiency, low power axial computer fans 38 of the blower fan array to provide a clean air delivery rate sufficient to clean the air of a standard sized room.

Up to two (2) flat-panel filters each of size equal in size to conventional flat-panel home furnace pleated filters of standard size, namely twenty (20) inches high by sixteen (16) inches wide by one (1) inch thick, not shown, may be removably mounted in tandem in the interior flat-panel receiving chamber 22. These filters may be conventional furnace filters having pleated particulate removal media, and/or include specialty media to remove or control other varieties of pollutants such as odors, ozone, and germs among others.

A rectangular gasket 46 mounted to the inside of the rear wall of the housing member 20 peripherally seals the confronting surfaces of the blower fan array and custom-size flat-panel filter 45 inside the flat-panel receiving chamber 22. Preferably, the gasket 46 is of neoprene rubber.

Figure 6:
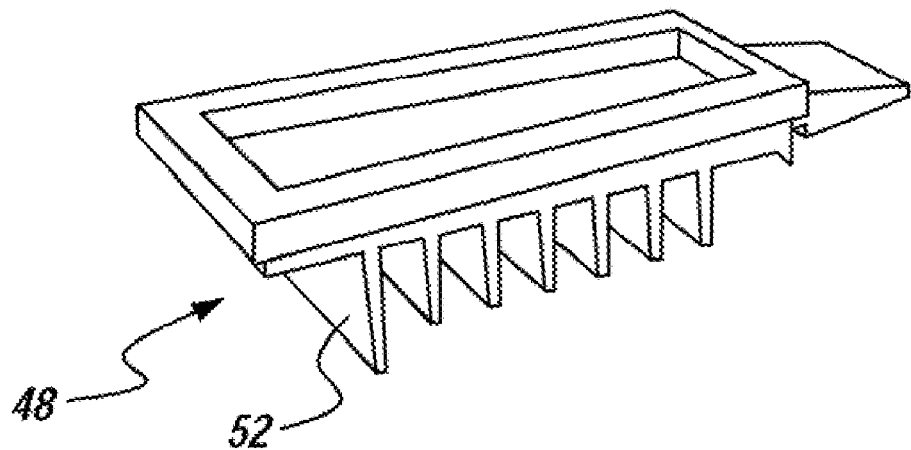
FIG. 6 and FIG. 7 are isometric views respectively showing top and bottom resilient shoulders of the high cleaning efficiency room air cleaner with a slim profile in accord with the present invention.
Figure 7:
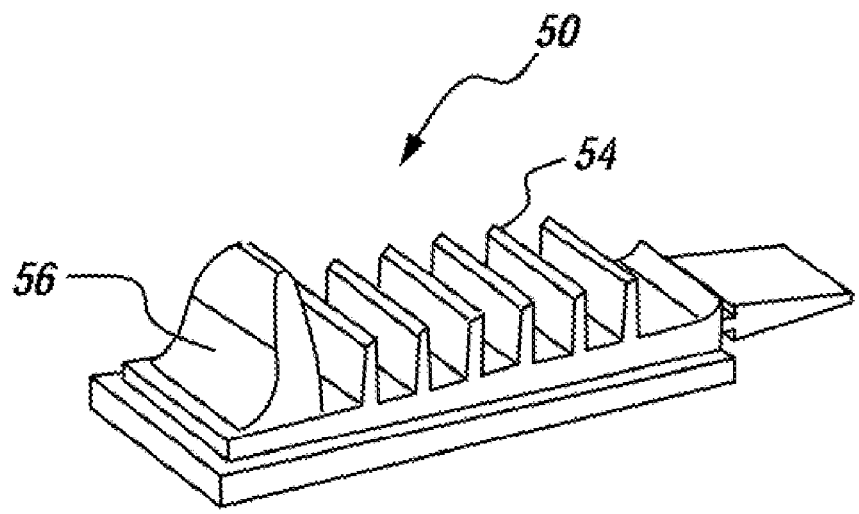
Figure 9:
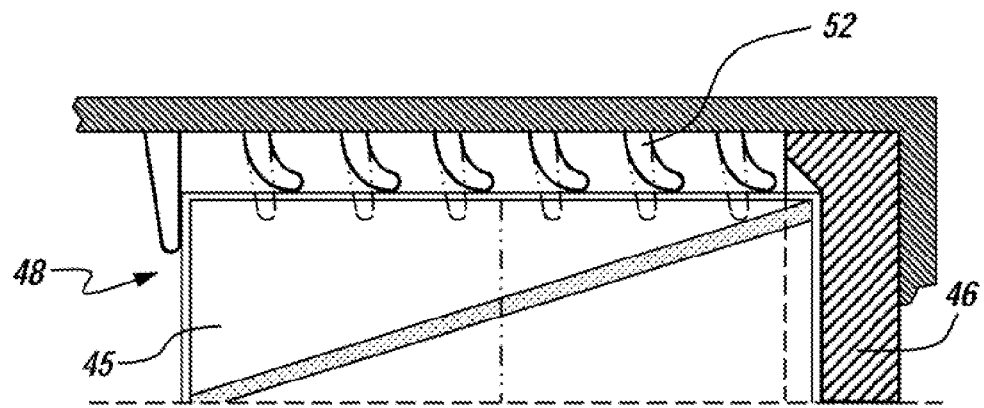
FIG. 9 and FIG. 10 are schematic detail diagrams that respectively illustrate how the top and bottom resilient shoulders seat the confronting top and bottom surfaces of flat-panel filters of the high cleaning efficiency room air cleaner with a slim profile in accord with the present invention.
Figure 10:
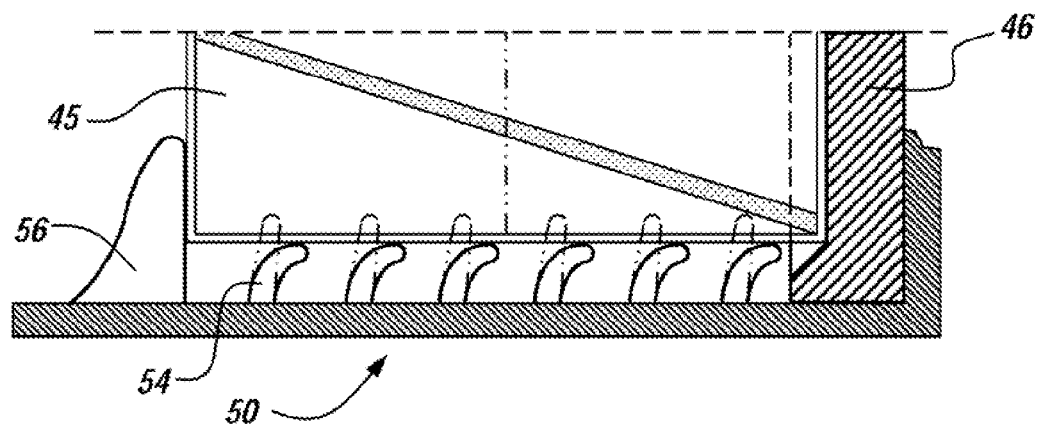

Elongated shoulders generally designated 48 are mounted to the inside of the top wall of the housing member 20 and elongated shoulders generally designated 50 are mounted to the inside of the bottom wall of the housing member 20. As best seen in FIGS. 6, 7, the elongated shoulders 48, 50 include a plurality of transversely extending resilient fingers 52, 54. As best seen in FIGS. 8-10, the transverse fingers 52, 54 of the top and bottom elongated shoulders 48, 50 provide resilient abutments that seat against and hold the flat-panel filter 45 and maintain its position in sealing relation with the gasket 46, and that seat against and hold each of up to two (2) flat-panel filters of standard size, not shown, and maintain the inside one of the up to two (2) tandem flat-panel filters of standard size in sealing relation with the gasket 46. The resilient fingers 52, 54 of the shoulders 48, 50, that preferably are spaced apart a distance that corresponds to their height, are bent differentially by different height flat-panel filters to take up any tolerance variations there may be between different manufacturers of otherwise "standard" size flat-panel filters. A different longitudinal spacing, more or less than their height, could be employed. The elongated shoulders 50 include a rigid end finger 56 which serves as a positioning stop for the custom-size filter 45; or for the outer one of tandem flat-panel filters of standard size, not shown.

Figure 11:
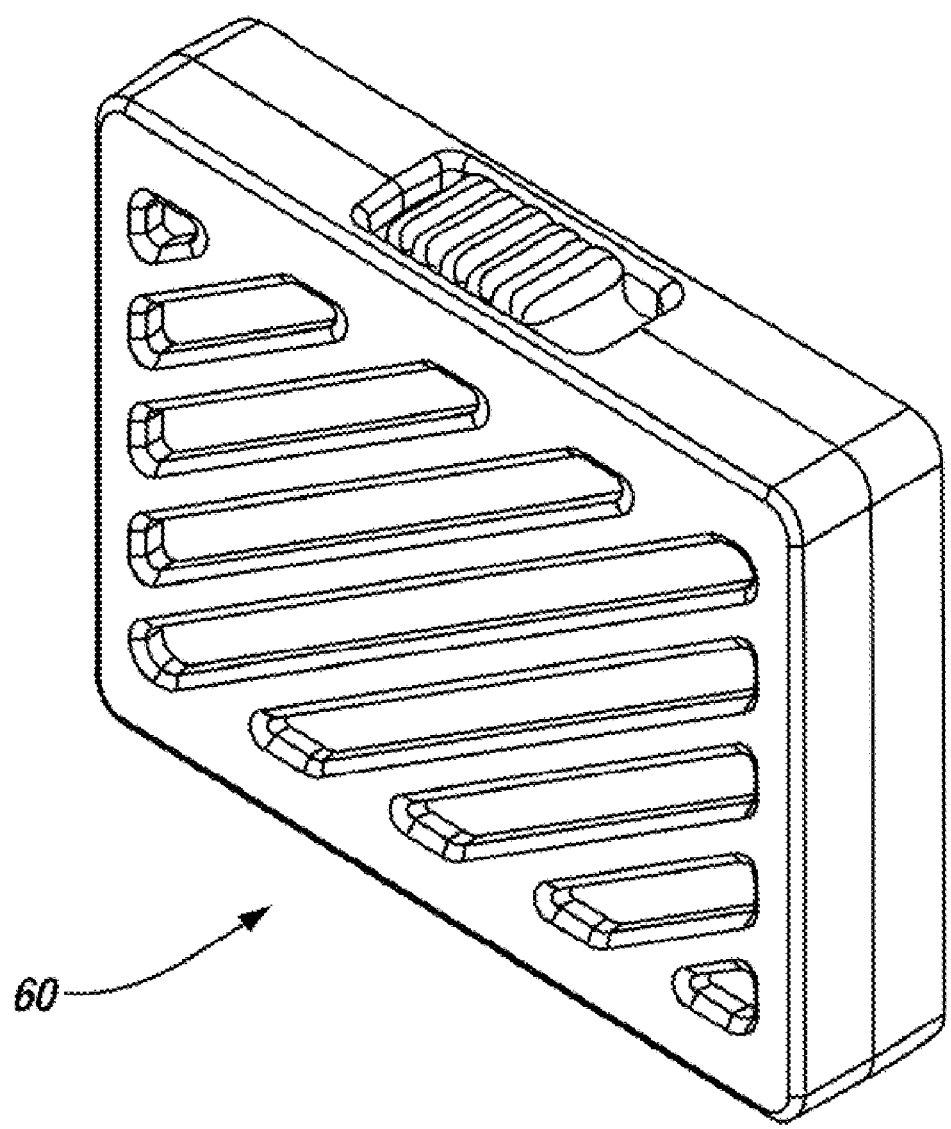
FIG. 11 is an isometric view of a removable scent cartridge of the high cleaning efficiency room air cleaner with a slim profile of the present invention and FIG. 12 is an exploded view of the same.
Figure 12:
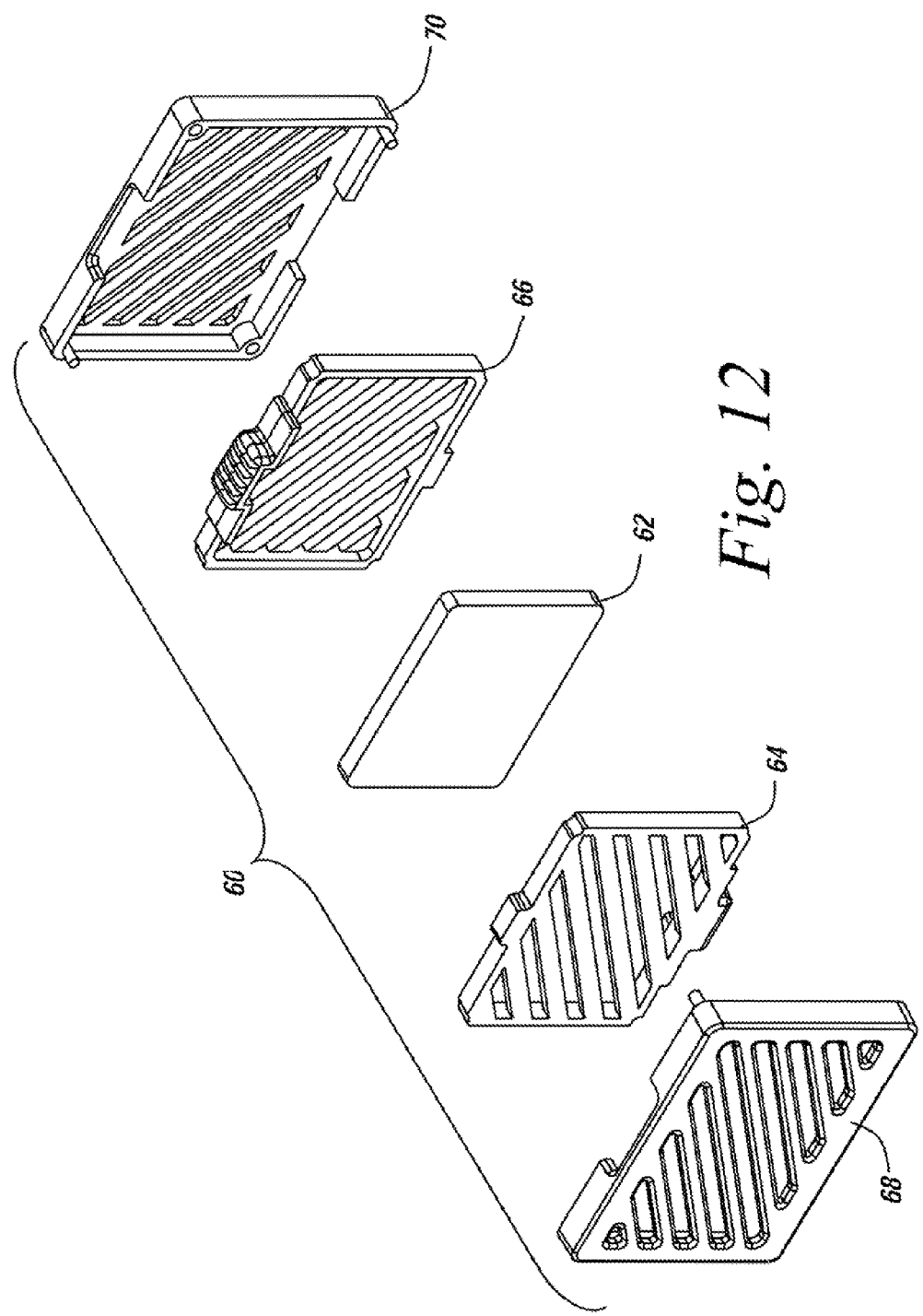

A scent cartridge generally designated 60 is removably retained in the rear grill 26 of the room air cleaner 10 by a scent cartridge cover 62. As best seen in FIGS. 11-12, the scent cartridge 60 includes a scent block 62 captured by an inner case constituted by casing members 64, 66, which is slidably movable within an outer case constituted by casing members 68, 70, so as to expose more or less of the surface of the scent block 62, thereby controlling the degree of fragrance added to the air stream flowing through the room air cleaner 10.

Many modifications of the presently disclosed invention will become apparent to those of skill in the art without departing from the inventive concepts.

What is claimed is:

1. A high cleaning efficiency room air cleaner with a slim profile, comprising:
    a flat-panel housing taller and wider than it is thick enclosing a flat-panel filter receiving chamber whose open interior is sized to accept at least one flat-panel filter that is taller and wider than it is thick;
    a planar array of axial fans each taller and wider than it is thick mounted to the flat-panel housing such that the axial fans of the planar fan array cooperate to axially move a plane of air through the open interior that is substantially coextensive in area to the surface area of said flat-panel filter that is taller and wider than it is thick; and
    front and rear grills respectively mounted to opposing sides of said flat-panel housing.

2. The high cleaning efficiency room air cleaner with a slim profile of claim 1, wherein the flat-panel filter receiving chamber is sized to accept in tandem two (2) conventional home furnace flat-panel pleated filters of standard size.

3. The high cleaning efficiency room air cleaner with a slim profile of claim 2, further including up to two (2) flat-panel filters of standard size received in tandem in the flat-panel filter receiving chamber of said flat-panel housing.

4. The high cleaning efficiency room air cleaner with a slim profile of claim 3, wherein at least one of said up to two (2) flat-panel filters of standard size is a conventional home furnace flat-panel pleated filter of standard size.

5. The high cleaning efficiency room air cleaner with a slim profile of claim 3, wherein at least one of said up to two (2) flat-panel filters of standard size is a flat-panel filter of standard size including specialty filter media.

6. The high cleaning efficiency room air cleaner with a slim profile of claim 2, further including a single flat-panel filter equal in thickness to the axial thickness of two (2) conventional home furnace flat-panel pleated filters of standard size received in the flat-panel filter receiving chamber of said flat-panel housing.

7. The high cleaning efficiency room air cleaner with a slim profile of claim 6, wherein said single flat-panel filter is a pleated particulate removal filter.

8. The high cleaning efficiency room air cleaner with a slim profile of claim 1, further including means including a gasket and resilient abutments for peripherally sealing the interface between the confronting surfaces of the fan array and flat-panel filter when a flat-panel filter is received in the flat-panel filter receiving chamber of said flat-panel housing.

9. The high cleaning efficiency room air cleaner with a slim profile of claim 8, wherein the resilient abutments include elongated shoulders having transversely extending resilient fingers.

10. The high cleaning efficiency room air cleaner with a slim profile of claim 9, wherein the resilient fingers of the elongated shoulders are spaced apart along the direction of elongation of the elongated shoulders a distance that corresponds to their height.

11. The high cleaning efficiency room air cleaner with a slim profile of claim 1, wherein the planar array of axial fans is a blower array.

12. The high cleaning efficiency room air cleaner with a slim profile of claim 8, wherein the blower array is a (3)*(2) blower fan array.

13. The high cleaning efficiency room air cleaner with a slim profile of claim 1, wherein the axial fans of the planar array are high efficiency, low power, brushless DC computer "muffin" fans.

14. The high cleaning efficiency room air cleaner with a slim profile of claim 1, wherein the flat-panel housing includes an interior UV lamp receiving chamber.

15. The high cleaning efficiency room air cleaner with a slim profile of claim 1, further including a scent cartridge to controllably introduce fragrance into the air moving through the flat-panel housing.

16. The high cleaning efficiency room air cleaner with a slim profile of claim 15, wherein the scent cartridge is removably mounted to one of said grills.

17. The high cleaning efficiency room air cleaner with a slim profile of claim 15, wherein the scent cartridge includes a scent block captured within an apertured inner case that is slidably mounted in an apertured outer case to control scent block exposure to air streaming therethrough.

18. The high cleaning efficiency room air cleaner with a slim profile of claim 1, further including a stand mounted to the bottom of the flat-panel housing.

19. The high cleaning efficiency room air cleaner with a slim profile of claim 18, wherein the stand has a lateral extent that defines the closest approach the room air cleaner may make to a side or other wall.

* * * * *